United States Patent
Batapati et al.

(10) Patent No.: US 11,604,681 B2
(45) Date of Patent: Mar. 14, 2023

(54) SYSTEMS AND METHODS FOR RELIABLE FLOW MEASUREMENT AND CONTROL

(71) Applicant: ABB Schweiz AG, Baden (CH)

(72) Inventors: Praveen Batapati, Jenks, OK (US); Brandel Panchoo, Bartlesville, OK (US); Kara York, Bartlesville, OK (US); Raghu Raman Nagarajan, Bartlesville, OK (US); Shreyas Matade, Bartlesville, OK (US)

(73) Assignee: ABB SCHWEIZ AG, Baden (CH)

( * ) Notice: Subject to any disclaimer, the term of this patent is extended or adjusted under 35 U.S.C. 154(b) by 131 days.

(21) Appl. No.: 17/171,168

(22) Filed: Feb. 9, 2021

(65) Prior Publication Data
US 2022/0253311 A1    Aug. 11, 2022

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/5011* (2013.01)

(58) Field of Classification Search
CPC .................................................... G06F 9/5038
See application file for complete search history.

(56) References Cited

U.S. PATENT DOCUMENTS

2021/0373953 A1 * 12/2021 Polackal ............... H04L 67/535

OTHER PUBLICATIONS

Phoenix Contact, "PLCnext Technology—The ecosystem for limitless automation", downloaded Feb. 9, 2021 from https://www.phoenixcontact.com, 3 pages.

* cited by examiner

*Primary Examiner* — Charlie Sun
(74) *Attorney, Agent, or Firm* — Armstrong Teasdale LLP (57) ABSTRACT

Systems and methods for reliable flow measurement and control may include a processor having multiple cores. The compute device may further include circuitry configured to identify a time-critical software application to satisfy a target execution parameter for the measurement or control of fluid flow in an industrial environment. The circuitry may be further configured to allocate at least one resource of the compute device to execute the time-critical software application in satisfaction of the target execution parameter with at least one other software application in a single operating system, including dedicating a core of the processor to the execution of the time-critical software application. Additionally, the circuitry may be configured to execute the time-critical software application with the at least one other software application in the single operating system in satisfaction of the target execution parameter.

20 Claims, 5 Drawing Sheets

SYSTEMS AND METHODS FOR RELIABLE FLOW MEASUREMENT AND CONTROL

BACKGROUND

The ability to reliably measure and control fluid flows is key to providing efficiency and safety in the oil and gas industries. Traditionally, measurement and control has been accomplished with proprietary stand-alone (e.g., specialized) devices with pre-installed time-critical software applications (e.g., closed systems). Such specialized devices do not provide a way for users to execute non-time-critical software applications concurrently on the devices. Rather, oil and gas companies typically incur the expense of purchasing open (e.g., general purpose) devices, such as personal or industrial computers to execute those non-time-critical software applications. In instances in which general purpose computers have been utilized to execute time-critical software applications alongside non-time-critical software applications, the reliability and predictability (e.g., responsiveness) of the time-critical applications have been compromised.

SUMMARY

According to one aspect of the present disclosure, a compute device may comprise a processor having multiple cores. The circuitry may be configured to identify a time-critical software application to satisfy a target execution parameter for the measurement or control of fluid flow in an industrial environment. The circuitry may further be configured to allocate at least one resource of the compute device to execute the time-critical software application in satisfaction of the target execution parameter with at least one other software application in a single operating system. The circuitry may be configured to dedicate a core of the processor to the execution of the time-critical software application. Further, the circuitry may be configured to execute the time-critical software application with the at least one other software application in the single operating system in satisfaction of the target execution parameter.

In some embodiments, to identify a time-critical software application comprises to identify a time-critical software application to execute one or more flow measurement or flow control operations for a flow of oil or gas in the industrial environment.

In some embodiments, to identify a time-critical software application comprises to identify a time-critical software application to execute one or more operations at a target speed.

In some embodiments, to identify a time-critical software application comprises to identify a time-critical software application to execute one or more operations at a target frequency or a target latency.

In some embodiments, to allocate at least one resource comprises to allocate at least one resource to execute the time-critical software application without assigning the time-critical software application to a virtualized or containerized environment.

In some embodiments, to allocate at least one resource comprises to assign an I/O interrupt service routine thread associated with the time-critical software application to the core dedicated to execution of the time-critical software application.

In some embodiments, to assign an I/O interrupt service routine thread comprises to assign an I/O interrupt service routine thread for data communication with a fluid flow measurement device or a fluid flow control device.

In some embodiments, the circuitry is further configured to allocate other cores of the processor to execution of the at least one other software application.

In some embodiments, to allocate at least one resource comprises to set a memory prioritization of the time-critical software application over a memory prioritization of the at least one other software application.

In some embodiments, the compute device further includes a random access memory, and to allocate at least one resource includes establishing, in the random access memory, a file system associated with the time-critical software application.

In some embodiments, the circuitry is further configured to copy data associated with the time-critical software application from a data storage to the file system in the random access memory.

In some embodiments, the circuitry is further configured to initiate a monitor software application to monitor a state of the time-critical software application and maintain continual execution of the time-critical software application.

In some embodiments, the circuitry is further configured to initiate the time-critical software application as a child process of the monitor software application.

In some embodiments, to execute the time-critical software application comprises to continually synchronize, between a file system in a random access memory of the compute device and data storage, data accessed by the time-critical software application.

In some embodiments, to execute the time-critical software application comprises to monitor, with a monitor software application, a state of the time-critical software application.

In some embodiments, to monitor, with the monitor software application, the state of the time-critical software application comprises to restart execution of the time-critical software application in response to a determination that execution of the time-critical software application stopped unexpectedly.

In some embodiments, to monitor, with the monitor software application, the state of the time-critical software application comprises to determine whether a number of times that execution of the time-critical software application has stopped unexpectedly satisfies a threshold number and restart, in response to a determination that the threshold number is satisfied, execution of the time-critical software application under a previous configuration of the time-critical software application.

In some embodiments, to execute the time-critical software application comprises to prevent deallocation of memory requested by the time-critical software application when a total amount of available memory is less than a total amount of memory requested by all software applications executed by the compute device.

In another aspect of the present disclosure, a method may comprise identifying, by a compute device, a time-critical software application to satisfy a target execution parameter for the measurement or control of fluid flow in an industrial environment. The method may additionally comprise allocating, by the compute device, at least one resource of the compute device to execute the time-critical software application in satisfaction of the target execution parameter with at least one other software application in a single operating system, including dedicating a core of a processor of the compute device to the execution of the time-critical software application. Further, the method may include executing, by the compute device, the time-critical software application with the at least one other software application in the single operating system in satisfaction of the target execution parameter.

In some embodiments, identifying a time-critical software application comprises identifying a time-critical software application to execute one or more flow measurement or flow control operations for a flow of oil or gas in the industrial environment.

In some embodiments, identifying a time-critical software application comprises identifying a time-critical software application to execute one or more operations at a target speed.

In some embodiments, identifying a time-critical software application comprises identifying a time-critical software application to execute one or more operations at a target frequency or a target latency.

In some embodiments, allocating at least one resource comprises allocating at least one resource to execute the time-critical software application without assigning the time-critical software application to a virtualized or containerized environment.

In some embodiments, allocating at least one resource comprises assigning an I/O interrupt service routine thread associated with the time-critical software application to the core dedicated to execution of the time-critical software application.

In some embodiments, assigning an I/O interrupt service routine thread comprises assigning an I/O interrupt service routine thread for data communication with a fluid flow measurement device or a fluid flow control device.

In some embodiments, the method additionally includes allocating other cores of the processor to execution of the at least one other software application.

In some embodiments, allocating at least one resource comprises setting a memory prioritization of the time-critical software application over a memory prioritization of the at least one other software application.

In some embodiments, the compute device further includes a random access memory, and allocating at least one resource includes establishing, in the random access memory, a file system associated with the time-critical software application.

In some embodiments, the method additionally includes copying data associated with the time-critical software application from a data storage to the file system in the random access memory.

In some embodiments, the method includes initiating a monitor software application to monitor a state of the time-critical software application and maintain continual execution of the time-critical software application.

In some embodiments, the method includes initiating the time-critical software application as a child process of the monitor software application.

In some embodiments, executing the time-critical software application includes continually synchronizing, between a file system in a random access memory of the compute device and data storage, data accessed by the time-critical software application.

In some embodiments, executing the time-critical software application comprises monitoring, with a monitor software application, a state of the time-critical software application.

In some embodiments, monitoring, with the monitor software application, the state of the time-critical software application comprises restarting execution of the time-critical software application in response to a determination that execution of the time-critical software application stopped unexpectedly.

In some embodiments, monitoring, with the monitor software application, the state of the time-critical software application comprises determining whether a number of times that execution of the time-critical software application has stopped unexpectedly satisfies a threshold number and restarting, in response to a determination that the threshold number is satisfied, execution of the time-critical software application under a previous configuration of the time-critical software application.

In some embodiments, executing the time-critical software application comprises preventing deallocation of memory requested by the time-critical software application when a total amount of available memory is less than a total amount of memory requested by all software applications executed by the compute device.

In another aspect of the present disclosure, one or more machine-readable storage media may comprise a plurality of instructions stored thereon that, in response to being executed, cause a compute device to identify a time-critical software application to satisfy a target execution parameter for the measurement or control of fluid flow in an industrial environment. The instructions may additionally cause the compute device to allocate at least one resource of the compute device to execute the time-critical software application in satisfaction of the target execution parameter with at least one other software application in a single operating system, including dedicating a core of a processor of the compute device to the execution of the time-critical software application. Additionally, the one or more instructions may cause the compute device to execute the time-critical software application with the at least one other software application in the single operating system in satisfaction of the target execution parameter.

In some embodiments, to identify a time-critical software application comprises to identify a time-critical software application to execute one or more flow measurement or flow control operations for a flow of oil or gas in the industrial environment.

In some embodiments, to identify a time-critical software application comprises to identify a time-critical software application to execute one or more operations at a target speed.

In some embodiments, to identify a time-critical software application comprises to identify a time-critical software application to execute one or more operations at a target frequency or a target latency.

In some embodiments, to allocate at least one resource comprises to allocate at least one resource to execute the time-critical software application without assigning the time-critical software application to a virtualized or containerized environment.

In some embodiments, to allocate at least one resource comprises to assign an I/O interrupt service routine thread associated with the time-critical software application to the core dedicated to execution of the time-critical software application.

In some embodiments, to assign an I/O interrupt service routine thread comprises to assign an I/O interrupt service routine thread for data communication with a fluid flow measurement device or a fluid flow control device.

In some embodiments, the instructions may additionally cause the compute device to allocate other cores of the processor to execution of the at least one other software application.

In some embodiments, to allocate at least one resource comprises to set a memory prioritization of the time-critical software application over a memory prioritization of the at least one other software application.

In some embodiments, the compute device further includes a random access memory, and to allocate at least one resource includes establishing, in the random access memory, a file system associated with the time-critical software application.

In some embodiments, the instructions may additionally cause the compute device to copy data associated with the time-critical software application from a data storage to the file system in the random access memory.

In some embodiments, the instructions may additionally cause the compute device to initiate a monitor software application to monitor a state of the time-critical software application and maintain continual execution of the time-critical software application.

In some embodiments, the instructions may additionally cause the compute device to initiate the time-critical software application as a child process of the monitor software application.

In some embodiments, to execute the time-critical software application comprises to continually synchronize, between a file system in a random access memory of the compute device and data storage, data accessed by the time-critical software application.

In some embodiments, to execute the time-critical software application comprises to monitor, with a monitor software application, a state of the time-critical software application.

In some embodiments, to monitor, with the monitor software application, the state of the time-critical software application comprises to restart execution of the time-critical software application in response to a determination that execution of the time-critical software application stopped unexpectedly.

In some embodiments, to monitor, with the monitor software application, the state of the time-critical software application comprises to determine whether a number of times that execution of the time-critical software application has stopped unexpectedly satisfies a threshold number and restart, in response to a determination that the threshold number is satisfied, execution of the time-critical software application under a previous configuration of the time-critical software application.

In some embodiments, to execute the time-critical software application comprises to prevent deallocation of memory requested by the time-critical software application when a total amount of available memory is less than a total amount of memory requested by all software applications executed by the compute device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
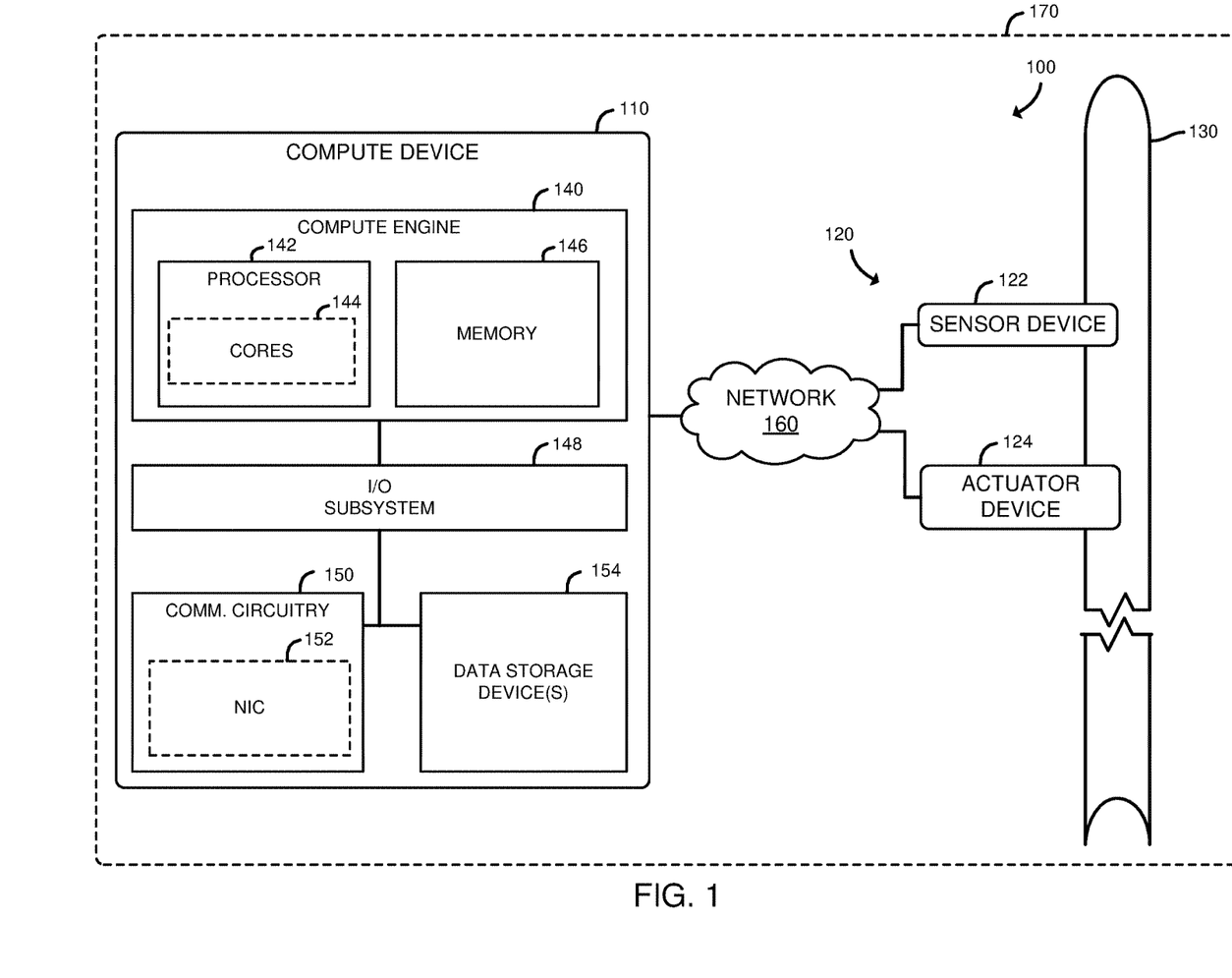
FIG. 1 is a simplified diagram of at least one embodiment of a system for providing reliable flow measurement and control.

Referring now to FIG. 1, a system 100 for providing reliable flow measurement and control includes a compute device 110 in communication with a set of field devices 120, including a sensor device 122 and an actuator device 124 to measure and control the flow of a fluid (e.g., oil, gas, etc.) through a pipeline 130. In the illustrative embodiment, the system 100 is located in an industrial environment 170 for an industrial process that entails the measurement and control of fluid (e.g., through the pipeline 130), such as in an oil or gas refining or distribution system. Unlike typical systems in which a special purpose device (e.g., compute device) is utilized solely to execute time-critical operations, such as receiving flow measurements (e.g., from one or more sensors) and selectively adjusting the flow (e.g., with one or more actuator devices, based on the flow measurements) and does not facilitate the execution of other operations that are not time-critical on the same device, the compute device 110 is capable of concurrently executing both time-critical software application(s) and other software applications that are not time-critical, without sacrificing the reliability (e.g., responsiveness and predictability) of the time-critical software application(s). As such, an organization may avoid the complexity and costs of installing and maintaining both special purpose devices for time-critical software applications and other compute devices for software applications that are not time-critical.

Still referring to FIG. 1, while one sensor device 122 and one actuator device 124 are shown, for simplicity, it should be understood that in other embodiments, the number and types of field devices 120 in communication with the compute device 110 may differ. The sensor device 122 may be embodied as any device capable of determining the flow of a fluid through a pipeline (e.g., the pipeline 130), such as a contact flow sensor (e.g., a vortex flow sensor having a latch that is in contact with the fluid and that flexes in relation to the direction and flow rate of the fluid, a mechanical flow sensor having a propeller that spins at rate that is proportional to the flow rate, etc.) or a non-contact flow sensor (e.g., an ultrasonic flow sensor having an emitter configured to emit a high frequency sound across a flowing fluid and a receiver to receive the emitted high frequency sound, and a timer component to measure the time that elapses between emission and reception of the high frequency sound). The actuator device 124 may be embodied as any device (e.g., an assembly of electrical and pneumatic or hydraulic components) capable of selectively moving a valve to increase or decrease the flow of a fluid through a pipeline (e.g., the pipeline 130).

The illustrative compute device 110 includes a compute engine 140, an input/output (I/O) subsystem 148, communication circuitry 150, and a data storage subsystem 154. Of course, in other embodiments, the compute device 110 may include other or additional components, such as those commonly found in a computer (e.g., display, peripheral devices, etc.). Additionally, in some embodiments, one or more of the illustrative components may be incorporated in, or otherwise form a portion of, another component.

The compute engine 140 may be embodied as any type of device or collection of devices capable of performing various compute functions described below. In some embodiments, the compute engine 140 may be embodied as a single device such as an integrated circuit, an embedded system, a field-programmable gate array (FPGA), a system-on-a-chip (SOC), or other integrated system or device. Additionally, in some embodiments, the compute engine 140 includes or is embodied as a processor 142 and a memory 146. The processor 142 may be embodied as any type of processor capable of performing the functions described herein. For example, the processor 142 may be embodied as a single or multi-core processor(s) (e.g., including multiple cores 144, each of which may be embodied as a processing device configured to read and execute program instructions), a microcontroller, or other processor or processing/controlling circuit. In some embodiments, the processor 142 may be embodied as, include, or be coupled to an FPGA, an application specific integrated circuit (ASIC), reconfigurable hardware or hardware circuitry, or other hardware to facilitate performance of the functions described herein.

The main memory 146 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 146 may be integrated into the processor 142. In operation, the main memory 146 may store various software and data used during operation such as executable instructions for time-critical software application(s) (e.g., for measurement and control of fluid flows), target execution parameters (e.g., latency targets, frequency targets, etc.), executable instructions for software application(s) that are not time-critical, resource allocation data (e.g., any data indicative of hardware resources allocated or to be allocated among the software applications), libraries, and drivers.

The compute engine 140 is communicatively coupled to other components of the compute device 110 via the I/O subsystem 148, which may be embodied as circuitry and/or components to facilitate input/output operations with the compute engine 140 (e.g., with the processor 142 and the main memory 146) and other components of the compute device 110. For example, the I/O subsystem 148 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 148 may form a portion of a system-on-a-chip (SoC) and be incorporated, along with one or more of the processor 142, the main memory 146, and other components of the compute device 110, into the compute engine 140.

The communication circuitry 150 may be embodied as any communication circuit, device, or collection thereof, capable of enabling communications over a communication link between the compute device 110 and another device (e.g., a field device 120 another compute device, etc.). The communication circuitry 150 may be configured to use any one or more communication technology (e.g., wired or wireless communications) and associated protocols (e.g., serial communication, Ethernet, Bluetooth®, Wi-Fi®, WiMAX, etc.) to effect such communication.

The illustrative communication circuitry 150 may include a network interface controller (NIC) 152. The NIC 152 may be embodied as one or more add-in-boards, daughter cards, network interface cards, controller chips, chipsets, or other devices that may be used by the compute device 110 to connect with another device (e.g., the field devices 120, another compute device, etc.). In some embodiments, the NIC 152 may be embodied as part of a system-on-a-chip (SoC) that includes one or more processors, or included on a multichip package that also contains one or more processors. In some embodiments, the NIC 152 may include a local processor (not shown) and/or a local memory (not shown) that are both local to the NIC 152. In such embodiments, the local processor of the NIC 152 may be capable of performing one or more of the functions of the compute engine 140 described herein. Additionally or alternatively, in such embodiments, the local memory of the NIC 152 may be integrated into one or more components of the compute device 110 at the board level, socket level, chip level, and/or other levels.

Each data storage device 154, may be embodied as any type of device configured for short-term or long-term storage of data such as, for example, memory devices and circuits, memory cards, hard disk drives, solid-state drives, or other data storage device. Each data storage device 154 may include a system partition that stores data and firmware code for the data storage device 154 and one or more operating system partitions that store data files and executables for operating systems.

The field devices 120 may have components similar to those described with reference to the compute device 110. The description of those components of the compute device 110 is equally applicable to the description of components of the field devices 120. Further, it should be appreciated that any of the compute device 110 and the field devices 120 may include other components, sub-components, and devices commonly found in a computing device, which are not discussed above in reference to the compute device 110 and not discussed herein for clarity of the description. Further, it should be understood that one or more components of the compute device 110 may be distributed across any distance, and are not necessarily housed in the same physical unit. Further, in some embodiments, the compute device 110 may be an industrial compute device, in which one or more of the hardware components have been ruggedized compared to corresponding components of a personal computer, to withstand vibrations, temperature variations, power fluctuations, and/or other conditions present in the industrial environment 170.

The field devices 120 and the compute device 110 are illustratively in communication via a network 160. The network 160 may be embodied as any set of communication link(s) including local area networks (LANs) or wide area networks (WANs), digital subscriber line (DSL) networks, cable networks (e.g., coaxial networks, fiber networks, etc.), global networks (e.g., the Internet), cellular networks (e.g., Global System for Mobile Communications (GSM), 3G, Long Term Evolution (LTE), Worldwide Interoperability for Microwave Access (WiMAX), 4G, 5G, etc.), a radio access network (RAN), an edge network, or any combination thereof.

Figure 2:
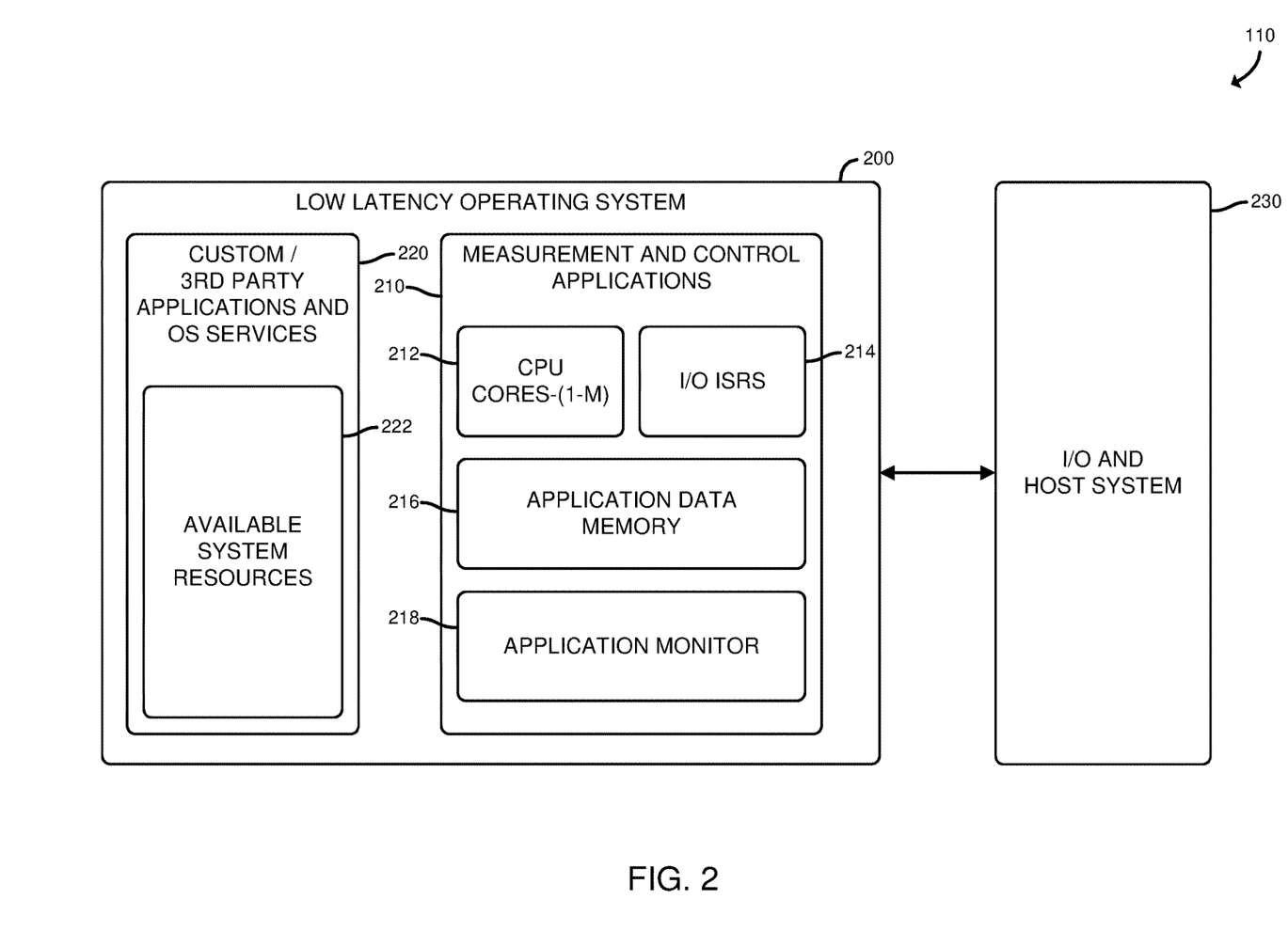
FIG. 2 is a simplified block diagram of an allocation of resources of a compute device of the system of FIG. 1 to provide reliable flow measurement and control.

Referring now to FIG. 2, the compute device 110 executes a low latency operating system 200, which may be embodied as any program (e.g., a low latency version of Ubuntu or other Linux variant, Microsoft Windows, etc.) that, after being initially loaded by a boot program, manages the execution of other software applications and the allocation of resources to those software applications. In the illustrative embodiment, software applications issue requests for services from the operating system 200 via a defined application program interface (API). In the illustrative embodiment, the operating system 200 is configured to enable low latency operations (e.g., performed within a predefined threshold amount of time) through the dedication of hardware resources (e.g., cores, memory, I/O bandwidth, etc.) to the operations that are to be performed with low latency (e.g., within the predefined threshold amount of time). As such, in the illustrative embodiment, a set of measurement and control applications (e.g., software applications) 210 utilize a designated set of resources that have been allocated to enable reliable (e.g., low latency) execution of time-critical operations (e.g., measurement and control of fluid flows) while custom or third party applications and operating system services 220 utilize the remainder of the available hardware resources 222 that have not been allocated for use solely by the measurement and control applications 210. The resources allocated solely for use by the measurement and control applications 210 include, in the illustrative embodiment, a set of processor core(s) 212 (e.g., the cores 144), input/output interrupt service routines (I/O ISRs) assigned to the allocated cores 212 for input and output processing via the host system 230 (e.g., to read measurement data obtained from the sensor device 122, to provide control requests to the actuator device 124, etc.), and application data memory 216 (e.g., the memory 146). As explained in more detail herein, the operating system 200 additionally executes an application monitor 218 which performs operations to ensure the continual execution of the measurement and control applications 210.

As discussed above, issues with existing architectures include closed systems in which proprietary devices may provide reliable execution of an application, but are not conducive to execution of custom or third party logic (e.g., software applications). As such, separate devices are typically used to execute the custom or third party logic, thereby increasing the deployment and maintenance costs of the systems. For typical open systems, reliability of time-critical applications (e.g., that their operations will be executed within a defined threshold amount of time) is not ensured as the system resources needed to execute the operations may not be continually available. Virtualization or containerization of one or more time-critical applications on a typical open system is not suitable for time-critical software applications, as the virtualized environment slows down execution, as compared to executing the same software applications in a native environment and may introduce other problems, such as an inability to administer a run time licensing scheme for those software applications. Some systems exist with two operating systems (e.g., a "normal" open operating system and a proprietary low latency operating system) on the same device. However, development or porting of time-critical applications suited for a given task for execution on the proprietary operating system may be difficult or impossible. The low latency operating system 200, represents a hybrid of closed and open systems and does not suffer from the above problems that are encountered with systems that are strictly open or closed.

Figure 3:
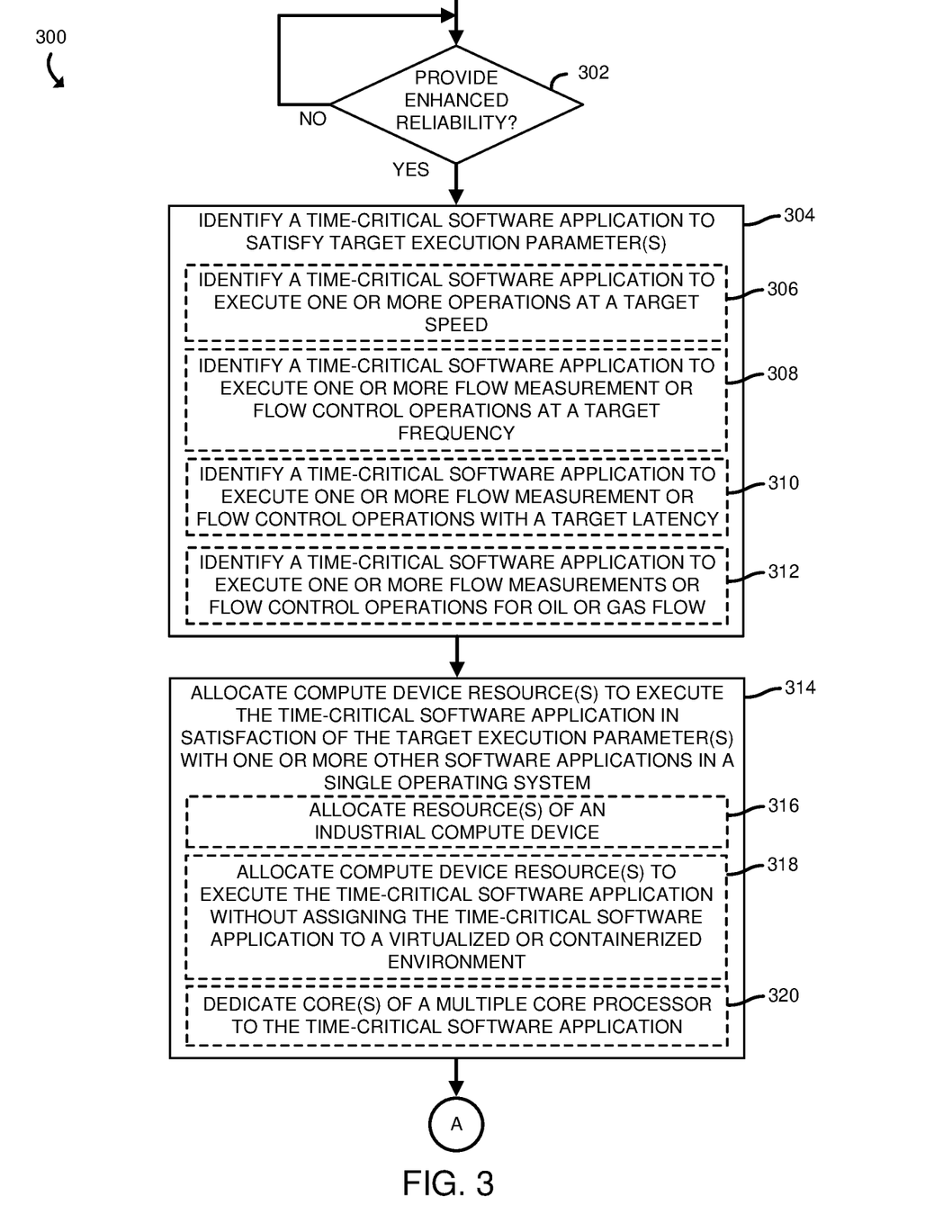
FIGS. 3-5 are simplified block diagrams of at least one embodiment of a method for providing reliable flow measurement and control that may be performed by the system of FIG. 1.

Referring now to FIG. 3, the system 100, and in particular, the compute device 110, may perform a method 300 for providing reliable flow measurement and control. In the illustrative embodiment, the method 300 begins with block 302, in which the compute device 110 determines whether to provide enhanced reliability. In doing so, the compute device 110 may determine to provide enhanced reliability in response to detecting a configuration setting (e.g., in a configuration file in the data storage 154), in response to detecting the presence of a connection to one or more field devices 120, and/or based on other factors. Regardless, in response to a determination to provide enhanced reliability, the method 300 advances to block 304, in which the compute device 110 identifies (e.g., in the data storage 154) a time-critical software application (e.g., one of the applications 210) to satisfy one or more target execution parameters (e.g., that is associated with a set of target execution parameters to be satisfied during the execution of the time-critical software application 210). The target execution parameters may be provided from a variety of sources, such as parameters from a bootloader configuration (e.g., Grand Unified (GRUB) bootloader), an initialization script, a configuration file, indicated in the executable instructions of the time-critical software application 210, etc. In identifying a time-critical software application 210, the compute device 110, in the illustrative embodiment, identifies a time-critical software application to execute one or more operations at a target speed (e.g., a speed identified in the target execution parameter(s)), as indicated in block 306.

As indicated in block 308, the compute device 110 may identify a time-critical software application to execute one or more flow measurement or flow control operations at a target frequency (e.g., measuring the flow ten times per second). Similarly, the compute device 110 may identify a time-critical software application to execute one or more flow measurement or flow control operations with a target latency (e.g., within a tenth of a second of obtaining a flow measurement that exceeds a target flow, issuing a request to the actuator device 124 to close a valve by a defined amount), as indicated in block 310. In the illustrative embodiment, and as indicated in block 312, the compute device 110 identifies a time-critical software application to execute one or more flow measurement or flow control operations for oil or gas flow (e.g., in the industrial environment 170).

Subsequently, the compute device 110 allocates one or more compute device resources to execute the time-critical software application 210 (e.g., identified in block 304) to satisfy the target execution parameter(s) along with one or more other software applications (e.g., software applications that are not time-critical, such as one or more of the applications 220) in a single operating system (e.g., rather than multiple operating systems on the same compute device), as indicated in block 314. In the illustrative embodiment, the method 300 includes allocating resources of an industrial compute device (e.g., the compute device 110 is an industrial compute device, rather than a personal computer), as indicated in block 316. As discussed above, in an industrial compute device one or more of the hardware components (e.g., resources) have been ruggedized compared to corresponding components of a personal computer, to withstand vibrations, temperature variations, power fluctuations, and/or other conditions present in an industrial environment. The components in an industrial compute device may also be designed to use less power than corresponding components in a personal computer.

As indicated in block 318, the compute device 110, in the illustrative embodiment, allocates compute device resource (s) to execute the time-critical software application 210 without assigning the time-critical software application to a virtualized or containerized environment (e.g., without executing the time-critical software application 210 in a virtual machine or container). In the illustrative embodiment, in block 320, the compute device 110 dedicates one or more cores of a multiple core processor (e.g., one or more of the cores 144 of the processor 142) to the identified time-critical software application 210. For example, a GRUB bootloader of an Ubuntu operating system may be modified to isolate one or more of the cores 144 for use by the time-critical software application 210. The bootloader configuration may then be used by the operating system kernel to allocate the core(s) 144 and ensure that the isolated core(s) 144 are excluded from the default run time scheduling. A Linux utility (e.g., taskset) may be used to assign the time-critical software application 210 process to the isolated core(s) 144 when the time-critical software application 210 is launched.

Figure 4:
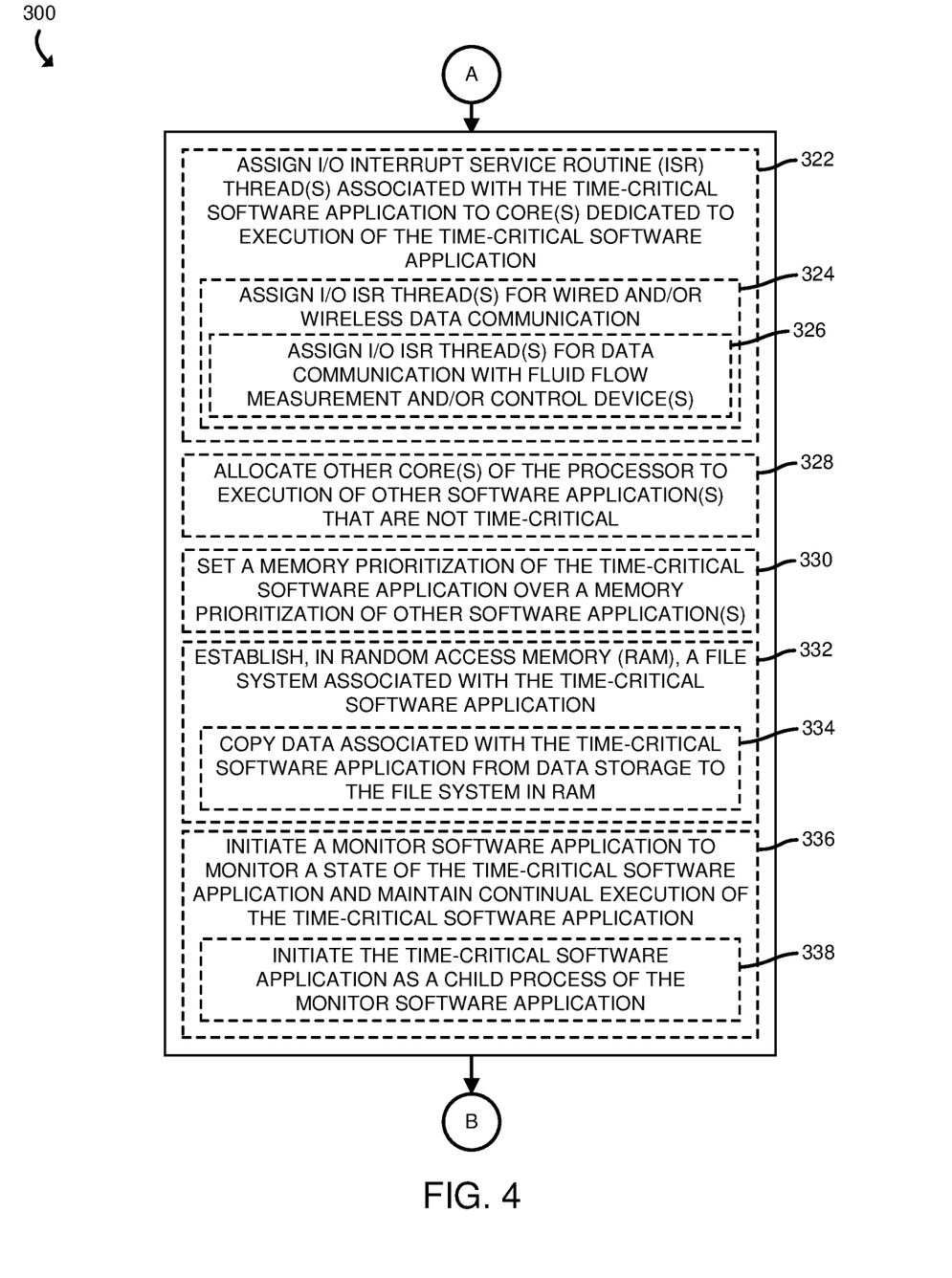

Referring now to FIG. 4, the compute device 110 may assign I/O interrupt service routine (IRS) thread(s) associated with the time-critical software application 210 to the core(s) 144 that have been dedicated to execution of the time-critical software application 210 (e.g., from block 320), as indicated in block 322. In doing so, and as indicated in block 324, the compute device 110 may assign I/O ISR thread(s) for wired or wireless data communication. In the illustrative embodiment, the compute device 110 assigns I/O ISR thread(s) (e.g., I/O ISRs 214) for data communication with fluid flow measurement and/or control devices (e.g., for data communication with the sensor device 122 and the actuator device 124), as indicated in block 326. Assigning the I/O ISR threads to the dedicated core(s) 144 reduces the likelihood that the operation of the I/O interfaces (e.g., in the communication circuitry 150) will be affected by other services executed on the compute device 110.

As indicated in block 328, the compute device 110 allocates other core(s) 144 of the processor 142 (e.g., the core(s) 144 that were not dedicated to the time-critical software application 210) to execution of one or more other software applications that are not time-critical (e.g., the custom/third party software application(s) 220). The compute device 110, in some embodiments, may set a memory prioritization of the time-critical software application 210 over a memory prioritization of other software application(s) (e.g., software applications that are not time-critical), as indicated in block 330. For example, the compute device 110 may set an out of memory (OOM) score for the time-critical software application 210 to increase the priority of the time-critical software application 210 during low memory conditions. In some embodiments, the compute device 110 may establish, in random access memory (RAM) (e.g., the memory 146, 216) a file system associated with the time-critical software application 210, as indicated in block 332. In doing so, and as indicated in block 334, the compute device 110 may copy data associated with the time-critical software application 210 from data storage (e.g., the data storage 154) to the file system in RAM (e.g., the memory 146, 216). For example, during startup of the time-critical software application 210, the compute device 110 may mount a Linux tmpfs file system of fixed size to reduce file system operation latencies. A non-intrusive background tasks may be scheduled to periodically synchronize (e.g., using the Linux rsync utility) the data between the RAM file system and persistent storage (e.g., the data storage 154).

Still referring to FIG. 4, and as indicated in block 336, the compute device 110 may initiate a monitor software application (e.g., the application monitor 218) to monitor a state of the time-critical software application 210 and maintain continual execution of the time-critical software application 210. In doing so, and as indicated in block 338, the compute device 110 may initiate the time-critical software application 210 as a child process of the monitor software application 218. For example, the monitor software application 218 may monitor Linux signals associated with the time-critical software application 210 to track the state of the time-critical software application 210. The method 300 subsequently advances to block 340 of FIG. 5, in which the compute device 110 executes the time-critical software application 210 with one or more other software applications (e.g., that are not time-critical) in the single operating system (e.g., the operating system 200) in satisfaction of the target execution parameter(s) (e.g., performing operations at the target frequency from block 308 and/or with the target latency from block 310).

Figure 5:
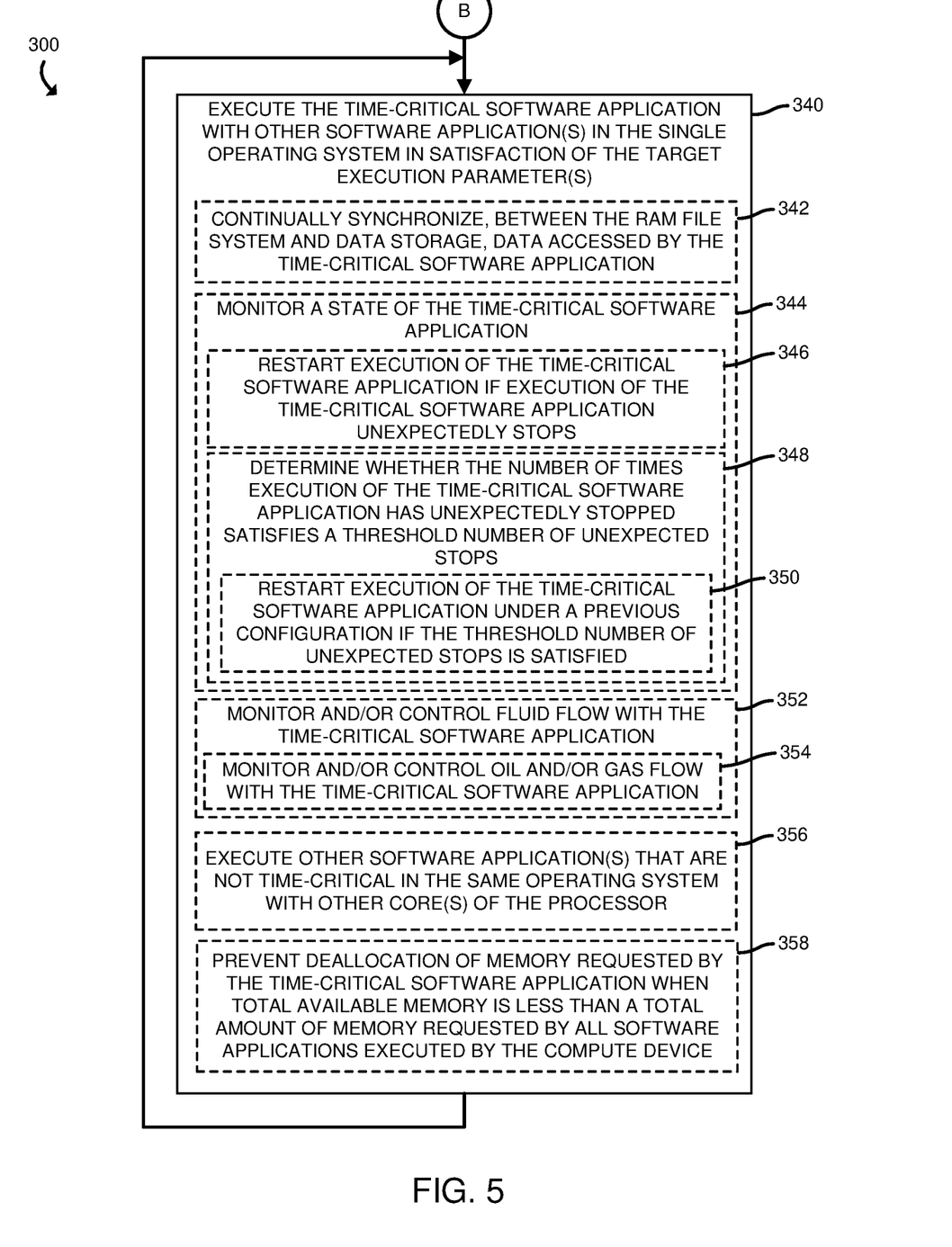

Referring now to FIG. 5, in executing the time-critical software application 210, the compute device 110, in the illustrative embodiment, continually synchronizes (e.g., using rsync), between the RAM file system (e.g., the RAM file system established in block 332) and the data storage, data accessed (e.g., written or read) by the time-critical software application 210, as indicated in block 342. Additionally, and as indicated in block 344, the compute device 110 may monitor a state of the time-critical software application 210 (e.g., using the application monitor 218). In doing so, and as indicated in block 346, the compute device 110 may restart execution of the time-critical software application 210 if execution of the time-critical software application 210 unexpectedly stops (e.g., as indicated by a corresponding SIGCHLD Linux signal to the application monitor 218, indicating that the time-critical software application 210 crashed). The compute device 110 may determine whether the number of times execution of the time-critical software application 210 has unexpectedly stopped (e.g., crashed) satisfies a threshold number of unexpected stops (e.g., a threshold number of crashes defined in a configuration file or other source), as indicated in block 348. Further, and as indicated in block 350, the compute device 110 may restart execution of the time-critical software application 210 under a previous configuration (e.g., in a safe mode) if the threshold number of unexpected stops is satisfied (e.g., if the time-critical software application 210 has crashed the threshold number of times).

In executing the time-critical software application 210, the compute device 110, in the illustrative embodiment, monitors and controls fluid flow with the time-critical software application 210, as indicated in block 352. In doing so, and as indicated in block 354, the compute device 110 monitors and controls oil or gas flow with the time-critical software application 210. The compute device 110, as indicated in block 356, also executes one or more other software applications that are not time-critical (e.g., the software applications 220) in the same operating system (e.g., the operating system 200), using the other cores 144 (e.g., the cores that are not dedicated to the time-critical software application 210) of the processor 142. As a result of the memory prioritization operation (e.g., from block 330), the compute device 110, in the illustrative embodiment, prevents deallocation of memory requested by the time-critical software application 210 when the total available memory is less than the total amount of memory requested by all software applications executed by the compute device 110. In other words, the compute device 110 may preserve the memory allocated to the time-critical software application 210 at the cost of other software applications (e.g., software applications 220 that are not time-critical) in low memory situations. While the operations of the method 300 are illustrated and described with reference to FIGS. 3-5 in a particular order, it should be understood that many of the operations could be performed in a different order or concurrently. For example, the compute device 110 may set the memory prioritization for the time-critical software application after establishing the RAM file system, or perform the operations concurrently.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A compute device comprising:
a processor having multiple cores;
circuitry configured to:
identify a time-critical software application to satisfy a target execution parameter for the measurement or control of fluid flow in an industrial environment;
allocate at least one resource of the compute device to execute the time-critical software application in satisfaction of the target execution parameter with at least one other software application in a single operating system, including dedicating a core of the processor to the execution of the time-critical software application; and
execute the time-critical software application with the at least one other software application in the single operating system in satisfaction of the target execution parameter.

2. The compute device of claim 1, wherein to identify a time-critical software application comprises to identify a time-critical software application to execute one or more flow measurement or flow control operations for a flow of oil or gas in the industrial environment.

3. The compute device of claim 1, wherein to identify a time-critical software application comprises to identify a time-critical software application to execute one or more operations at a target speed.

4. The compute device of claim 3, wherein to identify a time-critical software application comprises to identify a time-critical software application to execute one or more operations at a target frequency or a target latency.

5. The compute device of claim 1, wherein to allocate at least one resource comprises to allocate at least one resource to execute the time-critical software application without assigning the time-critical software application to a virtualized or containerized environment.

6. The compute device of claim 1, wherein to allocate at least one resource comprises to assign an I/O interrupt service routine thread associated with the time-critical software application to the core dedicated to execution of the time-critical software application.

7. The compute device of claim 6, wherein to assign an I/O interrupt service routine thread comprises to assign an I/O interrupt service routine thread for data communication with a fluid flow measurement device or a fluid flow control device.

8. The compute device of claim 1, wherein the circuitry is further to allocate other cores of the processor to execution of the at least one other software application.

9. The compute device of claim 1, wherein to allocate at least one resource comprises to set a memory prioritization of the time-critical software application over a memory prioritization of the at least one other software application.

10. The compute device of claim 1, further comprising a random access memory, and wherein to allocate at least one resource comprises to establish, in the random access memory, a file system associated with the time-critical software application.

11. The compute device of claim 10, wherein the circuitry is further to copy data associated with the time-critical software application from a data storage to the file system in the random access memory.

12. The compute device of claim 1, wherein the circuitry is further to initiate a monitor software application to monitor a state of the time-critical software application and maintain continual execution of the time-critical software application.

13. The compute device of claim 12, wherein the circuitry is further to initiate the time-critical software application as a child process of the monitor software application.

14. The compute device of claim 1, wherein to execute the time-critical software application comprises to continually synchronize, between a file system in a random access memory of the compute device and data storage, data accessed by the time-critical software application.

15. The compute device of claim 1, wherein to execute the time-critical software application comprises to monitor, with a monitor software application, a state of the time-critical software application.

16. The compute device of claim 15, wherein to monitor, with the monitor software application, the state of the time-critical software application comprises to restart execution of the time-critical software application in response to a determination that execution of the time-critical software application stopped unexpectedly.

17. The compute device of claim 15, wherein to monitor, with the monitor software application, the state of the time-critical software application comprises to:
determine whether a number of times that execution of the time-critical software application has stopped unexpectedly satisfies a threshold number; and
restart, in response to a determination that the threshold number is satisfied, execution of the time-critical software application under a previous configuration of the time-critical software application.

18. The compute device of claim 1, wherein to execute the time-critical software application comprises to prevent deallocation of memory requested by the time-critical software application when a total amount of available memory is less than a total amount of memory requested by all software applications executed by the compute device.

19. A method comprising:
identifying, by a compute device, a time-critical software application to satisfy a target execution parameter for the measurement or control of fluid flow in an industrial environment;
allocating, by the compute device, at least one resource of the compute device to execute the time-critical software application in satisfaction of the target execution parameter with at least one other software application in a single operating system, including dedicating a core of a processor of the compute device to the execution of the time-critical software application; and
executing, by the compute device, the time-critical software application with the at least one other software application in the single operating system in satisfaction of the target execution parameter.

20. One or more non-transitory machine-readable storage media comprising a plurality of instructions stored thereon that, in response to being executed, cause a compute device to:
identify a time-critical software application to satisfy a target execution parameter for the measurement or control of fluid flow in an industrial environment;
allocate at least one resource of the compute device to execute the time-critical software application in satisfaction of the target execution parameter with at least one other software application in a single operating system, including dedicating a core of a processor of the compute device to the execution of the time-critical software application; and
execute the time-critical software application with the at least one other software application in the single operating system in satisfaction of the target execution parameter.

* * * * *